US011208137B2

(12) United States Patent
Floerchinger et al.

(10) Patent No.: US 11,208,137 B2
(45) Date of Patent: Dec. 28, 2021

(54) STEERING COLUMN ASSEMBLY FOR A MOTOR VEHICLE, STEERING SYSTEM AND SWITCHABLE LOCKING UNIT

(71) Applicant: ZF Automotive Germany GmbH, Alfdorf (DE)

(72) Inventors: Juergen Floerchinger, Erkrath (DE); Goriun Grigorians, Meerbusch (DE)

(73) Assignee: ZF Automotive Germany GmbH, Alfdorf (DE)

( * ) Notice: Subject to any disclaimer, the term of this patent is extended or adjusted under 35 U.S.C. 154(b) by 53 days.

(21) Appl. No.: 16/645,747

(22) PCT Filed: Sep. 7, 2018

(86) PCT No.: PCT/EP2018/074163
§ 371 (c)(1),
(2) Date: Mar. 9, 2020

(87) PCT Pub. No.: WO2019/048621
PCT Pub. Date: Mar. 14, 2019

(65) Prior Publication Data
US 2020/0283053 A1   Sep. 10, 2020

(30) Foreign Application Priority Data

Sep. 7, 2017  (DE) .......................... 102017120669.8

(51) Int. Cl.
*B62D 1/181* (2006.01)
*B62D 1/10* (2006.01)
(Continued)

(52) U.S. Cl.
CPC ............... *B62D 1/181* (2013.01); *B62D 1/10* (2013.01); *B62D 1/184* (2013.01); *B62D 5/006* (2013.01); *B62D 1/19* (2013.01)

(58) Field of Classification Search
CPC .......... B62D 1/181; B62D 1/10; B62D 1/184; B62D 5/006; B62D 1/19
See application file for complete search history.

(56) References Cited

U.S. PATENT DOCUMENTS 2,074,334 A  3/1937  Hughes
2,769,351 A  11/1956 Serfling et al.
(Continued)

FOREIGN PATENT DOCUMENTS

DE   102015224602 A1   6/2017

*Primary Examiner* — Drew J Brown
(74) *Attorney, Agent, or Firm* — Robert James Harwood

(57) ABSTRACT

A steering column assembly for a motor vehicle, having an outer tube which is arranged in a rotationally fixed manner, a telescopic steering column which is received at least in part in the outer tube, and a rotary drive which is adapted to telescopically adjust the telescopic steering column, wherein the telescopic steering column comprises a first steering column portion and a second steering column portion which surrounds the first steering column portion at least in part. The two steering column portions are coupled with one another in a telescopic portion. in such a manner that they are telescopically displaceable relative to one another. The rotary drive is in engagement with the first steering column portion so that the rotary drive transfers a force to the first steering column portion in order to telescopically adjust the telescopic steering column.

20 Claims, 3 Drawing Sheets

(51) Int. Cl.
*B62D 1/184* (2006.01)
*B62D 5/00* (2006.01)
*B62D 1/19* (2006.01)

(56) References Cited

U.S. PATENT DOCUMENTS

| | | | |
|---|---|---|---|
| 4,598,604 A * | 7/1986 | Sorsche | B62D 1/181 |
| | | | 74/425 |
| 4,691,587 A * | 9/1987 | Farrand | B62D 1/181 |
| | | | 280/775 |
| 10,228,047 B2 * | 3/2019 | Nunez | F16H 25/20 |
| 10,633,013 B2 * | 4/2020 | Kreutz | B62D 1/183 |
| 2008/0202276 A1 | 8/2008 | Harris et al. | |
| 2012/0234127 A1 | 9/2012 | Okano et al. | |
| 2013/0305871 A1 | 11/2013 | Ohara et al. | |
| 2019/0283793 A1 * | 9/2019 | Matsuno | B62D 1/192 |
| 2021/0009189 A1 * | 1/2021 | Munding | B62D 1/185 |
| 2021/0024120 A1 * | 1/2021 | Rey | B60R 25/02156 |

\* cited by examiner

STEERING COLUMN ASSEMBLY FOR A MOTOR VEHICLE, STEERING SYSTEM AND SWITCHABLE LOCKING UNIT

CROSS-REFERENCE TO RELATED APPLICATION

This application is a national stage of International Application No. PCT/EP2018/074163, filed Sep. 7, 2018, the disclosure of which is incorporated herein by reference in its entirety, and which claimed priority to German Patent Application No. 102017120669.8, filed Sep. 7, 2017, the disclosure of which is incorporated herein by reference in its entirety.

TECHNICAL FIELD

The invention relates to a steering column assembly for a motor vehicle and to a steering system having a steering column assembly. The invention relates additionally to a switchable locking unit for the steering column assembly.

BACKGROUND

The steering systems used in motor vehicles conventionally comprise a steering column assembly, in which the steering wheel is coupled with at least one steering column, via which a steering moment applied by the driver of the vehicle, or an applied steering angle, is transferred.

In so-called steer-by-wire steering systems, the steering moment applied by the driver of the vehicle, or the applied steering angle, is detected via sensors, which transmit the corresponding data to a control assembly, which correspondingly controls the wheels of the motor vehicle in order to execute the desired steering command. In steer-by-wire steering systems, it is known that a force feedback actuator is provided, which is connected to the steering column in order to simulate at the steering wheel the forces that occur from the road and the steering geometry of the steering system, that is to say of the steering gear and the gear rack, so that the driver of the vehicle has the feeling that it is a conventional, wholly mechanical steering system. For example, the force feedback actuator is in the form of a rotary drive.

Also known are (mechanical) steering systems which comprise an electromechanical steering assistance mechanism, for example a servo steering mechanism. These steering systems too comprise an actuator which can be in the form of a rotary drive.

Generally, (mechanical) steering systems with an additional actuator can be referred to as EPS (electric power steering) steering systems because they provide a moment in addition to, or in dependence on, the steering moment applied mechanically by the driver of the vehicle.

It is further known that modern motor vehicles have steering systems which are operated at least partly autonomously. This means that the motor vehicle inter alia steers automatically, without manual intervention on the part of the driver of the vehicle, for example in an autonomous parking mode. It can thereby be provided that there is a mechanical interruption in the steering system between the steering wheel and the steering gear, in particular via a coupling. Furthermore, the steering systems can comprise two or more different steering modes, for example a manual steering mode and an autonomous steering mode, wherein the steering wheel in the autonomous steering mode is displaced axially along the steering column as compared with the manual steering mode, in order inter alia to signal to the driver of the vehicle that the autonomous steering mode is activated and to provide him with more space. In such steering systems which comprise an autonomous steering mode, it can additionally be provided that the steering wheel should also turn if a steer-by-wire steering system, or EPS steering system, is operating in the autonomous steering mode. Accordingly, an actuator must be provided which generates a corresponding torque which is transferred to the steering wheel.

In order to be able to perform the mentioned functions, it is known that, externally, the steering systems comprise inter alia motors, couplings and gears for telescopically adjusting the steering column, for mechanically uncoupling the steering wheel from the steering gear or for generating a turning movement of the steering wheel. However, it has thereby been found to be disadvantageous that the required installation space for such a steering system is significantly larger as compared with a conventional (mechanical) steering system which does not have a vehicle mode for autonomous driving, or an autonomous steering mode.

SUMMARY

The object of the invention is to provide a steering column assembly and a steering system which provide the additional function of an autonomous steering mode and nevertheless require a small installation space.

The object is achieved according to the invention by a steering column assembly for a motor vehicle, having an outer tube which is arranged in a rotationally fixed manner, a telescopic steering column which is received at least in part in the outer tube, and a rotary drive which is adapted to telescopically adjust the telescopic steering column, wherein the telescopic steering column comprises a first steering column portion and a second steering column portion which surrounds the first steering column portion at least in part, wherein the two steering column portions are coupled with one another in a telescopic portion in such a manner that they are telescopically displaceable relative to one another, and wherein the rotary drive is in engagement with the first steering column portion so that the rotary drive transfers a force to the first steering column portion in order to telescopically adjust the telescopic steering column.

The idea underlying the invention is to form a compact steering column assembly by integrating a telescopic adjusting mechanism in the steering column assembly, in particular in the outer tube arranged in a rotationally fixed manner. The telescopic adjusting mechanism is thereby driven by the rotary drive, which is coupled directly with the first steering column portion, in order correspondingly to telescopically adjust the telescopic steering column. In this respect, the construction of a conventional (mechanical) steering system is used, in particular of an EPS steering system, with which the telescopic displacement of the steering wheel, which is used, for example, in an autonomous steering mode, is additionally possible.

The telescopic adjusting mechanism comprises the telescopic steering column, in particular the two steering column portions, and the rotary drive, with which the telescopic steering column is correspondingly driven in order to be telescopically adjusted.

The second steering column portion can have, at an opposite end to the first steering column portion, a steering wheel interface via which a steering wheel can be attached. The driver of the vehicle is accordingly able to initiate a steering movement via the steering wheel, which is attached to the second steering column portion, which steering movement is correspondingly detected, or implemented, by the steering column assembly. Alternatively, the steering wheel can be actively driven via the second steering column portion, so that a turning movement of the steering wheel is generated. This is provided inter alia in the case of an autonomous steering mode, so that the driver of the vehicle can quickly detect the steering movement which has been undertaken at the steering wheel.

In particular, the rotary drive is in the form of a force feedback actuator. Accordingly, the rotary drive serves inter alia to initiate a force feedback at the steering wheel, which is provided, for example, in a steer-by-wire steering system in order to simulate the influences of the road, the wheels and the steering geometry. Alternatively, the rotary drive can be part of an electromechanical steering assistance mechanism, for example a servo steering mechanism.

One aspect provides that there is provided a first switchable locking element which is coupled with the outer tube and the second steering column portion, wherein the first switchable locking element has an open position and a closed position. Via the locking element, it is accordingly possible to couple the second steering column portion with the outer tube so that the second steering column portion is connected in a rotationally fixed manner to the outer tube arranged in a rotationally fixed manner, whereby rotation of the second steering column portion is not possible. The steering wheel coupled with the second steering column portion is thus not turned.

In particular, the first switchable locking element in the open position permits a relative rotation of the second steering column portion relative to the outer tube and/or the first switchable locking element in the closed position prevents a relative rotation of the second steering column portion relative to the outer tube. Accordingly, in the closed position it is not possible for the driver of the vehicle to turn the steering wheel, because the steering wheel is coupled with the outer tube arranged in a rotationally fixed manner. Also, a turning movement of the steering wheel is not initiated in the closed position of the first switchable locking element. The open position of the first switchable locking element, on the other hand, is suitable in particular for a (manual) steering mode in which the driver of the vehicle operates the steering wheel manually, since a relative rotation between the second steering column portion and the rotationally fixed outer tube is thereby possible. The open position of the first switchable locking element is further suitable for actively driving the steering wheel in an autonomous steering mode in order to perform a turning movement which corresponds to the autonomously performed steering movement.

According to a further aspect there is provided a second switchable locking element which is coupled with the first steering column portion and the second steering column portion, wherein the second switchable locking element has an open position and a closed position. The two steering column portions can accordingly be coupled with and uncoupled from one another, according to the position of the locking element. Different functions can thereby be provided.

In particular, the second switchable locking element in the open position permits a relative movement of the second steering column portion relative to the first steering column portion and/or the second switchable locking element in the closed position prevents a relative movement of the second steering column portion relative to the first steering column portion. Accordingly, in the closed position, the two steering column portions are coupled with one another in a rotationally fixed manner, so that the closed position is suitable to be provided in the (manual) steering mode, so that a steering movement applied to the second steering column portion is transferred to the first steering column portion. Likewise, the two steering column portions are coupled with one another in a rotationally fixed manner when the steering wheel is to be actively controlled in an autonomous steering mode in order to simulate the steering movement at the steering wheel, in particular via the rotary drive. In the open position of the second switchable locking element, on the other hand, a relative movement of the two steering column portions can be carried out, so that this position is suitable for a telescopic adjusting mode in which the telescopic steering column is telescopically adjusted. In this respect, an axial and rotational movement can generally be opened or closed via the second locking element.

According to one embodiment, the steering column assembly has a telescopic adjusting mode in which a first switchable locking element is in its closed position and a second switchable locking element is in its open position. The steering column assembly can additionally have a (manual) steering mode in which the first switchable locking element is in its open position and the second switchable locking element is in its closed position. In the telescopic adjusting mode, an (axial) relative movement of the two steering column portions relative to one another is thus possible, so that the telescopic steering column can be telescopically adjusted. In the telescopic adjusting mode, the second switchable closing element is correspondingly in its open position, so that an (axial) relative movement of the two steering column portions relative to one another is possible, whereby the two steering column portions can be adjusted in the axial direction relative to one another, that is to say telescopically. Furthermore, in the telescopic adjusting mode, the first switchable locking element is in its closed position, so that the second steering column portion is coupled in a rotationally fixed manner (with the outer tube arranged in a rotationally fixed manner). This means, for example, that the outer tube arranged in a rotationally fixed manner is displaced axially together with the second steering column portion if the second steering column portion is telescopically adjusted relative to the first steering column portion. Alternatively, the second steering column portion can also be adjusted relative to the outer tube in the telescopic adjusting mode.

In the (manual) steering mode, on the other hand, it is provided that the two steering column portions are coupled together in a rotationally fixed manner, so that there can be no relative movement between the two steering column portions. If the driver of the vehicle initiates a turning movement at the steering wheel, this movement is correspondingly transferred via the two steering column portions. If the steering system is a steer-by-wire steering system, the applied steering moment, or the steering angle provided, can be detected via sensors. The sensors can be provided on the steering wheel, on the second steering column portion and/or on the first steering column portion. Moreover, the rotary drive, which is in engagement with the first steering column portion, can generate a force feedback in the manual steering mode. In the manual steering mode, on the other hand, the first switchable locking element is in its open position, so that a rotation of the second steering column portion relative to the outer tube arranged in a rotationally fixed manner is possible.

In addition to the manual steering mode there can be provided an autonomous steering mode with steering simulation, in which the first switchable locking element is in its open position and the second switchable locking element is in its closed position. In this autonomous steering mode with steering simulation, however, a torque is not applied by the driver, but the steering moment generated by a control assembly is transmitted via the rotary drive, so that the steering wheel turns according to the steering movement which is performed. The driver of the vehicle is thus able to reproduce the autonomously performed steering movements at the steering wheel, since the steering wheel is correspondingly controlled by the rotary drive via the two steering column portions. This is possible because, on the one hand, the second switching element provides a coupling of the two steering column portions and the first switching element permits a relative rotation of the second steering column portion relative to the outer tube arranged in a rotationally fixed manner.

According to one aspect, the first steering column portion has on the outside an adjustment outside geometry which corresponds to an adjustment inside geometry on the inside of the second steering column portion. The adjustment inside geometry and the adjustment outside geometry are provided in the telescopic portion of the telescopic steering column, in which the two steering column portions are coupled with one another. Accordingly, the two steering column portions can be adjusted relative to one another via the geometries that are present in each case. It can be provided that the respective geometries extend on the outside or inside over an axial distance of approximately from 250 mm to 350 mm, in particular 300 mm, so that a corresponding adjustment path is provided.

In particular, the adjustment outside geometry and/or the adjustment inside geometry comprise or comprises a thread, a spiral serration and/or a ball screw nut. These geometries ensure that the two steering column portions can be telescopically adjusted relative to one another if the rotary drive drives the first steering column portion in rotation in the telescopic adjusting mode. The second steering column portion, which is coupled with the outer tube in a rotationally fixed manner in the telescopic adjusting mode, is thereby telescopically adjusted in the axial direction via the corresponding geometries, because it is incapable of co-rotation. The correspondingly configured geometries convert the rotational movement of the first steering column portion of the telescopic steering column into an axial movement of the second steering column portion, so that the two steering column portions are moved relative to one another in the axial direction in the telescopic portion.

According to a further aspect there is provided a switchable locking unit which comprises a first switchable locking element and a second switchable locking element which cooperate with at least one drive, wherein the switchable locking unit has a telescopic adjusting mode in which the first switchable locking element is in its closed position and the second switchable locking element is in its open position, and/or wherein the switchable locking unit has a steering mode in which the first switchable locking element is in its open position and the second switchable locking element is in its closed position. The steering column assembly can thereby be adjusted in a simple manner between the two modes, since both locking elements are driven via the at least one drive in order to be transferred into the corresponding position.

The first switchable locking element can cooperate with the second steering column portion, wherein the first switchable locking element has an open position and a closed position. In the open position, a relative rotation of the second steering column portion relative to the outer tube is possible. In the closed position, on the other hand, a relative rotation is prevented, because the first switchable locking element in the closed position forms a stop for the second steering column portion. The first switching element is moved by the outer tube into a rotational movement region of the second steering column portion, so that rotation of the second steering column portion is prevented. The first switchable locking element in the closed position provides an interlocking connection for the second steering column portion, in particular in the radial direction.

In particular, the first switchable locking element in the open position accordingly permits a relative rotation of the second steering column portion relative to the outer tube and/or the first switchable locking element in the closed position prevents a relative rotation of the second steering column portion relative to the outer tube. Accordingly, in the closed position it is not possible for the driver of the vehicle to turn the steering wheel, because the steering wheel is coupled with the outer tube arranged in a rotationally fixed manner. Also, a turning movement of the steering wheel is not initiated in the closed position of the first switchable locking element. The open position of the first switchable locking element, on the other hand, is suitable in particular for a (manual) steering mode in which the driver of the vehicle operates the steering wheel manually, since a relative rotation between the second steering column portion and the rotationally fixed outer tube is thereby possible. The open position of the first switchable locking element is further suitable for actively driving the steering wheel in an autonomous steering mode in order to perform a turning movement which corresponds to the autonomously performed steering movement.

The second switchable locking element can likewise cooperate with the second steering column portion, wherein the second switchable locking element has an open position and a closed position. In the open position, an axial relative movement of the second steering column portion relative to the outer tube is possible. In the closed position, on the other hand, an axial relative movement is prevented, because the second switchable locking element in the closed position provides an interlocking connection for the second steering column portion, in particular in the axial direction.

In particular, the second switchable locking element in the open position permits a relative movement of the second steering column portion relative to the first steering column portion, that is to say an axial adjustment of the steering column portions relative to one another, and/or the second switchable locking element in the closed position prevents a relative movement of the second steering column portion relative to the first steering column portion. The closed position is suitable to be provided in the manual steering mode, so that a steering movement applied to the second steering column portion is transferred to the first steering column portion. Likewise, the two steering column portions are coupled with one another in a rotationally fixed manner when the steering wheel is to be actively controlled in an autonomous steering mode in order to simulate the steering movement at the steering wheel, in particular via the rotary drive. In the open position of the second switchable locking element, on the other hand, a relative movement of the two steering column portions can be carried out, so that this position is suitable for a telescopic adjusting mode in which the telescopic steering column is telescopically adjusted. In this respect, an axial and rotational movement can generally be opened or closed via the second locking element.

It is possible to provide only one drive, which controls the two locking elements in opposite directions. In this respect, only one locking element can be in its open or closed position. Consequently, it is impossible for both locking elements to be in their open or closed positions simultaneously. This can be correspondingly ensured by the use of a single drive which controls the two locking elements in opposite directions. To that end, the drive can have a drive shaft which is associated with both locking elements, wherein the drive shaft correspondingly controls the locking elements in opposite directions during operation of the drive.

The invention further provides a steering system having a steering column assembly of the type mentioned hereinbefore. The steering system can be a steer-by-wire system, so that the rotary drive is a force feedback actuator. Alternatively or in addition, the steering system can comprise an assistance system, for example an autonomous parking unit, an autonomous lane departure warning system and/or an autonomous driving unit. Further alternatively or in addition, the steering system can comprise an electromechanical steering assistance mechanism which comprises a corresponding actuator. It is thus possible to accommodate an autonomous steering mode and a manual steering mode in a steering system in a compact manner, because no additional or external components have to be used to implement a telescopic adjusting mechanism provided therein, which is used in an autonomous steering mode. The telescopic adjusting mechanism is integrated in the steering column assembly, in particular in the outer tube arranged in a rotationally fixed manner, so that the same components can be used as are used in a conventional EPS steering system. Thus, no external components are necessary to achieve the additional function of the telescopic adjusting mechanism, since the telescopic adjusting mechanism is formed by the components which are conventionally present in a steering column assembly of a (mechanical or steer-by-wire) steering system.

The invention additionally provides a switchable locking unit for a steering column assembly, having a first switchable locking element and a second switchable locking element which cooperate with at least one drive, wherein a first transfer member driven by the drive is associated with the first switchable locking member, wherein a second transfer member driven by the drive is associated with the second switchable locking member, and wherein the first transfer member and the second transfer member each have a ramp-like contour via which the respective transfer member cooperates with the associated locking element. The switchable locking unit can be coupled in a simple manner with the steering column assembly in order to interact via the respective locking elements with the telescopic steering column, in particular the second steering column portion of the telescopic steering column. The respective locking elements can be correspondingly controlled, or adjusted, by the ramp-like contours of the transfer members, that is to say moved into the movement range of the second steering column portion of the telescopic steering column, in order to limit a corresponding movement. This can take place in a simple manner via an interlocking connection. The above-mentioned advantages and properties of the switchable locking unit are obtained analogously.

In particular there is provided only one drive, which controls the two locking elements in opposite directions. In this respect, only one locking element can be in its open or closed position. Consequently, it is impossible for both locking elements to be in their open or closed positions simultaneously. This can be correspondingly ensured by the use of a single drive. To that end, the drive can have a drive shaft which is associated with both locking elements, wherein the drive shaft correspondingly controls the locking elements in opposite directions during operation of the drive.

One aspect provides that the first transfer member and/or the second transfer member are/is configured to transfer a rotational movement into a lifting movement of the associated locking element. To that end, the respective transfer member is rotatably mounted so that it is driven in rotation by the drive. Via the ramp-like contour, the associated locking element is then correspondingly adjusted in a lifting manner so that it is introduced into the steering column assembly.

According to a further aspect, the switchable locking unit has a telescopic adjusting mode in which the first switchable locking element is in its closed position and the second switchable locking element is in its open position, and/or wherein the switchable locking unit has a steering mode in which the first switchable locking element is in its open position and the second switchable locking element is in its closed position. The steering column assembly can thereby be adjusted in a simple manner between the two modes, because both the locking elements are driven via the at least one drive in order to be transferred into the corresponding position.

In principle, the steering column assembly according to the invention can comprise a switchable locking unit of the type mentioned hereinbefore.

BRIEF DESCRIPTION OF THE FIGURES

Further advantages and properties of the invention will become apparent from the following description and the drawing, to which reference is made. In the drawings.

DETAILED DESCRIPTION

Figure 1:
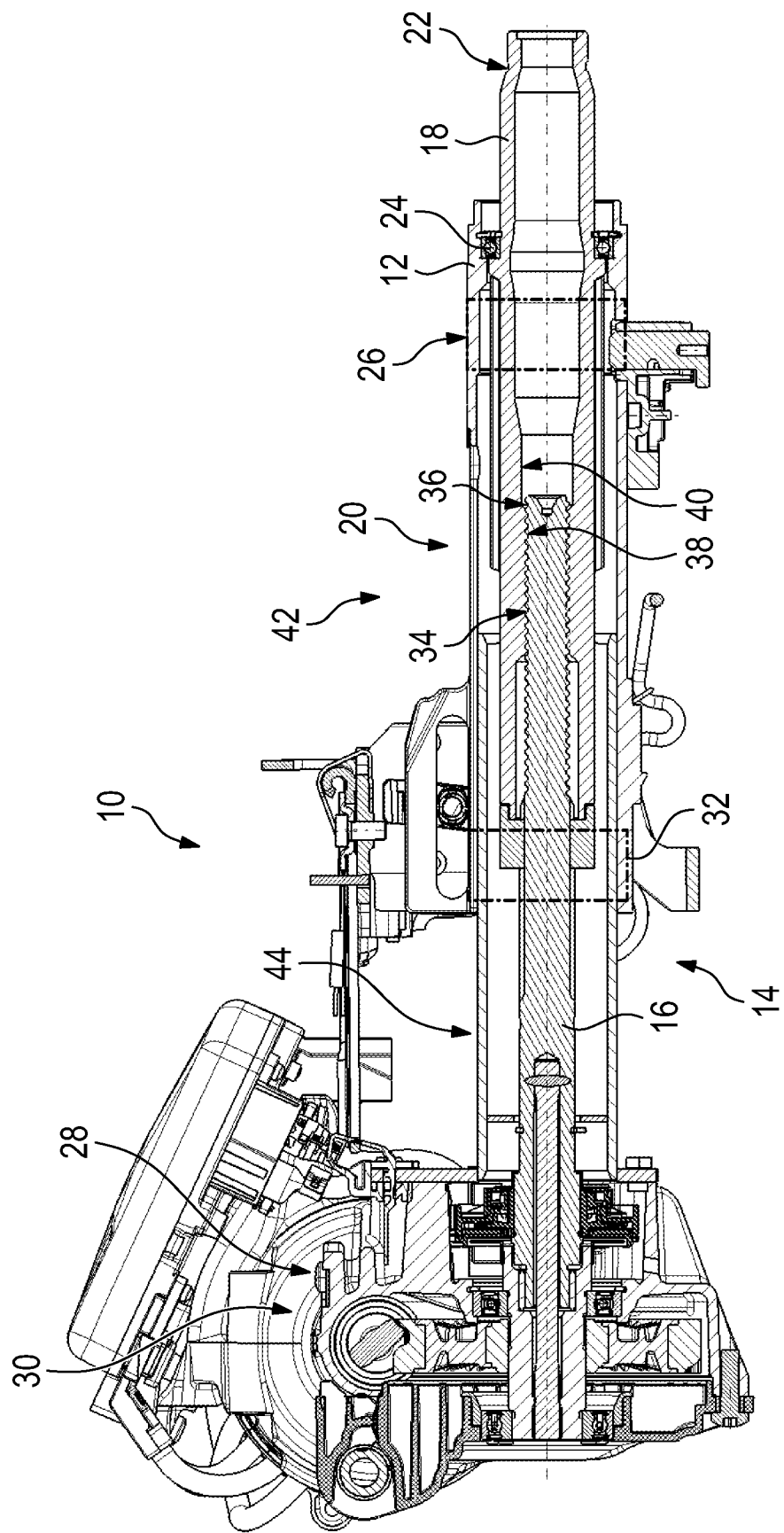
FIG. 1 is a sectional view of a steering system according to the invention having a steering column assembly according to the invention.

The steering column assembly 10 comprises an outer tube 12 which is arranged in a rotationally fixed manner and in which a telescopic steering column 14 is arranged at least in part. The telescopic steering column 14 comprises a first steering column portion 16 and a second steering column portion 18 which surrounds the first steering column portion 16 at least in part in a telescopic portion 20 in which the two steering column portions 16, 18 are coupled with one another.

The second steering column portion 18 comprises a steering wheel interface 22, via which a steering wheel, not shown here, can be coupled with the second steering column portion 18 so that a driver of the motor vehicle can correspondingly operate the steering column assembly 10, in particular in a manual steering mode, as will be explained hereinbelow.

The second steering column portion 18 is rotatably mounted via a bearing 24 inside the outer tube 12, which is arranged in a rotationally fixed manner, wherein there is provided between the outer tube 12 and the second steering column portion 18 a first switchable locking element 26, which is shown only schematically.

The first switchable locking element 26 has an open position in which a relative rotation of the second steering column portion 18 relative to the outer tube 12 arranged in a rotationally fixed manner is possible, namely via the bearing 24. The first switchable locking element 26 further has a closed position in which the outer tube 12 is coupled in a rotationally fixed manner with the second steering column portion 18, so that relative rotation between the outer tube 12 and the second steering column portion 18 is not possible. Generally, the second steering column portion 18 cannot rotate when the first locking element 26 is in the closed position. The functioning of the first switchable locking element 26 will be explained hereinbelow.

The first steering column portion 16, which is coupled with the second steering column portion 18 in the telescopic portion 20, is additionally in engagement with a rotary drive 28, so that the rotary drive 28 can drive the first steering column portion 16 in rotation. The rotary drive 28 can be a worm drive which drives the first steering column portion 16 in rotation, in particular in both directions of rotation.

The rotary drive 28 can be in the form of a force feedback actuator 30, via which feedback from the road, the wheels or the steering geometry, that is to say the steering rod, is conventionally simulated if the steering system is a steer-by-wire steering system which does not have a mechanical linkage between the steering wheel and the wheels. Alternatively or in addition, the rotary drive 28 can be part of an electromechanical steering assistance mechanism, which is part of a servo steering mechanism, for example.

The rotational movement generated by the rotary drive 28 can be transferred via the first steering column portion 16 to the second steering column portion 18 if a second switchable locking element 32, which is coupled with the first steering column portion 16 and the second steering column portion 18, is in its closed position. The second switchable locking element 32 is associated with the telescopic portion 20 of the telescopic steering column 14, wherein it can assume, in addition to the closed position, an open position in which a relative movement of the two steering column portions 16, 18 relative to one another is possible.

In the closed position of the second switchable locking element 32, however, there is a rotationally fixed connection between the two steering column portions 16, 18, so that a steering moment, or a corresponding steering angle, applied by the driver of the vehicle can be transferred via the entire telescopic steering column 14, that is to say via both the steering column portions 16, 18 coupled with one another. There can thereby be a mechanical linkage from the steering wheel, which is arranged on the second steering column portion 18, to the wheels if the steering system is a conventional (mechanical) steering system.

Alternatively, the steering system can be in the form of a steer-by-wire steering system, so that the applied steering moment, or the steering angle, is detected by at least one sensor, which transmits the corresponding signals to a control assembly for the wheels, which are correspondingly electronically controlled. In this respect, the steering system has a manual steering mode, which can be in the form of a mechanical steering mode or in the form of a steer-by-wire steering mode.

The steering system additionally has a telescopic adjusting mode, in which the telescopic steering column 14 is telescopically adjusted. Accordingly, in the telescopic adjusting mode, the two steering column portions 16, 18 are telescopically adjusted relative to one another, wherein the adjustment takes place via the telescopic portion 20.

In the telescopic adjusting mode, the first switchable locking element 26 is in its closed position, so that a relative rotation of the second steering column portion 18 to the outer tube 12, which is arranged in a rotationally fixed manner, is not possible. In addition, the second switchable locking element 32 is in its open position, so that a relative movement of the two steering column portions 16, 18 relative to one another is possible.

If the rotary drive 28 then applies a rotational movement to the first steering column portion 16, with which the rotary drive 28 is in engagement, that rotational movement of the first steering column portion 16 is converted into an axial, translational movement of the second steering column portion 18, because the first steering column portion 16 has on its outside 34 a correspondingly configured adjustment outside geometry 36, which cooperates with a corresponding adjustment inside geometry 38 of the second steering column portion 18 which is provided on the inside 40 of the second steering column portion 18.

The geometries can be a thread, a spiral serration and/or a ball screw nut, so that the rotational movement of the first steering column portion 16 is correspondingly converted into the translational movement of the second steering column portion 18 relative to the first steering column portion 16. This is possible because the second steering column portion 18 is coupled in a rotationally fixed manner with the outer tube 12, so that the second steering column portion 18 is arranged in a likewise rotationally fixed but axially displaceable manner.

In this respect, the second steering column portion 18 is adjusted translationally in the axial direction relative to the first steering column portion 16, wherein this can take place over a distance of from 250 mm to 350 mm, in particular 300 mm. The distance is defined via the respective geometries 36, 38 of the two steering column portions 16, 18 in the telescopic portion 20.

The telescopic adjusting mode is suitable in particular for an autonomous steering mode of the steering system, in which the motor vehicle performs the steering movement automatically, so that the steering wheel is moved into a retracted position as compared with the manual or steer-by-wire steering mode, in order to give the driver of the vehicle more space.

The two steering column portions 16, 18, in particular in the telescopic portion 20, and the rotary drive 28 together constitute a telescopic adjusting mechanism 42 of the steering column assembly 10, via which the steering wheel can correspondingly be telescopically adjusted, for example until it comes into contact with the dashboard of the motor vehicle.

If a manual steering mode is to be provided, in particular a mechanical or steer-by-wire steering mode, the first switchable locking element 26 is switched into its open position, whereas the second switchable locking element 32 is switched into its closed position, so that the second steering column portion 18 is able to rotate relative to the outer tube 12 arranged in a rotationally fixed manner and at the same time there is a rotating coupling between the two steering column portions 16, 18. The second steering column portion 18 is thereby rotatably connected to the rotary drive 28 via the first steering column portion 16.

In a steer-by-wire steering system, the rotary drive 28 can then function as a force feedback actuator 30, so that it generates corresponding torques in the steering wheel which are correspondingly to simulate the road, the wheels or the steering geometry in order to impart to the driver of the vehicle the feeling of a conventional (mechanical) steering system.

In addition, the first switchable locking element 26 can be in its open position and the second switchable locking element 32 can be in its closed position if an autonomous steering mode with steering simulation is chosen. The motor vehicle thereby performs the steering movement autonomously, wherein the steering movements are indicated to the driver of the vehicle via the steering wheel, in particular the turning movement thereof. As a result of the positions of the locking elements 26, 32, the rotary drive 28 can correspondingly drive the second steering column portion 18 and the steering wheel fixed thereto in rotation in order to reproduce the autonomously performed steering movements at the steering wheel. The telescopic adjusting mechanism 42, in particular the telescopic portion 20, is generally so configured via the two geometries 36, 38 that angular movements and torques can be transferred.

The steering column assembly 10 is further so configured that, in the event of an accident, it has an energy-absorbing region 44 which is located outside the telescopic portion 20. For example, the energy-absorbing region 44 is provided between the telescopic portion 20 and the rotary drive 28. The energy-absorbing portion 44 can further be provided between the telescopic portion 20 and the steering wheel interface 22. There are thus provided a steering column assembly 10 and a steering system with which a telescopic adjusting mechanism 42 which can be provided for an autonomous steering mode is formed in a compact manner.

Figure 2:
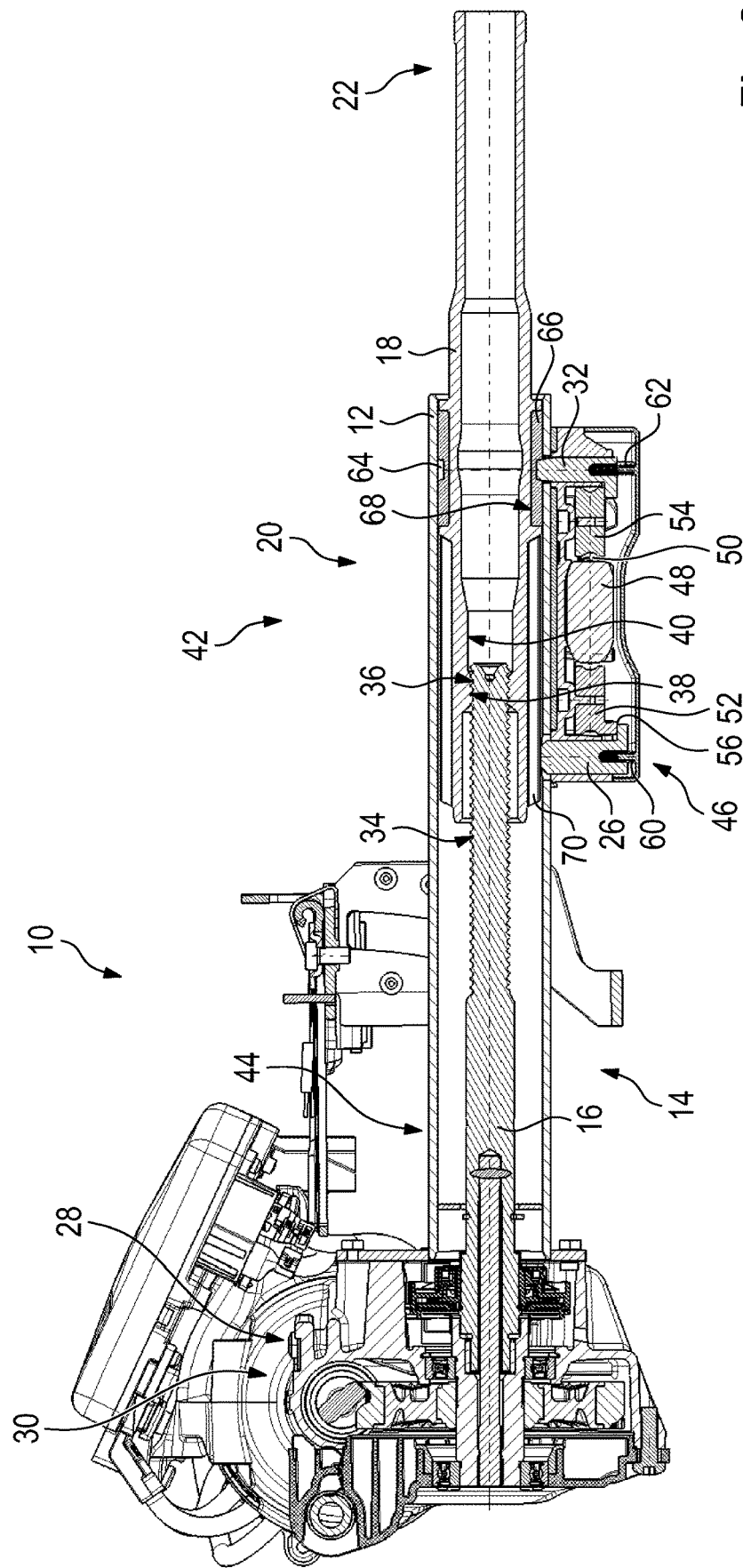
FIG. 2 is a sectional view of a steering system according to the invention having a steering column assembly according to the invention which comprises a switchable locking unit according to the invention.

FIG. 2 shows a further embodiment which differs from the embodiment shown in FIG. 1 in the form of the locking elements 26, 32. The functions of the locking elements 26, 32 are, however, substantially analogous to the first embodiment described hereinbefore, so that reference is made thereto. This means that the first locking element 26 is likewise provided to be adjusted between an open position in the steering mode and a closed position in the telescopic adjusting mode. Likewise, the second locking element 32 is provided to be adjusted between an open position in the telescopic adjusting mode and a closed position in the steering mode.

The second embodiment differs from the first embodiment in that the two locking elements 26, 32 are accommodated together in a switchable locking unit 46 which is attached to the outside of the outer tube 12 arranged in a rotationally fixed manner, as is clear from FIG. 2. The switchable locking unit 46 has a housing with a cover, which is removable.

Figure 3:
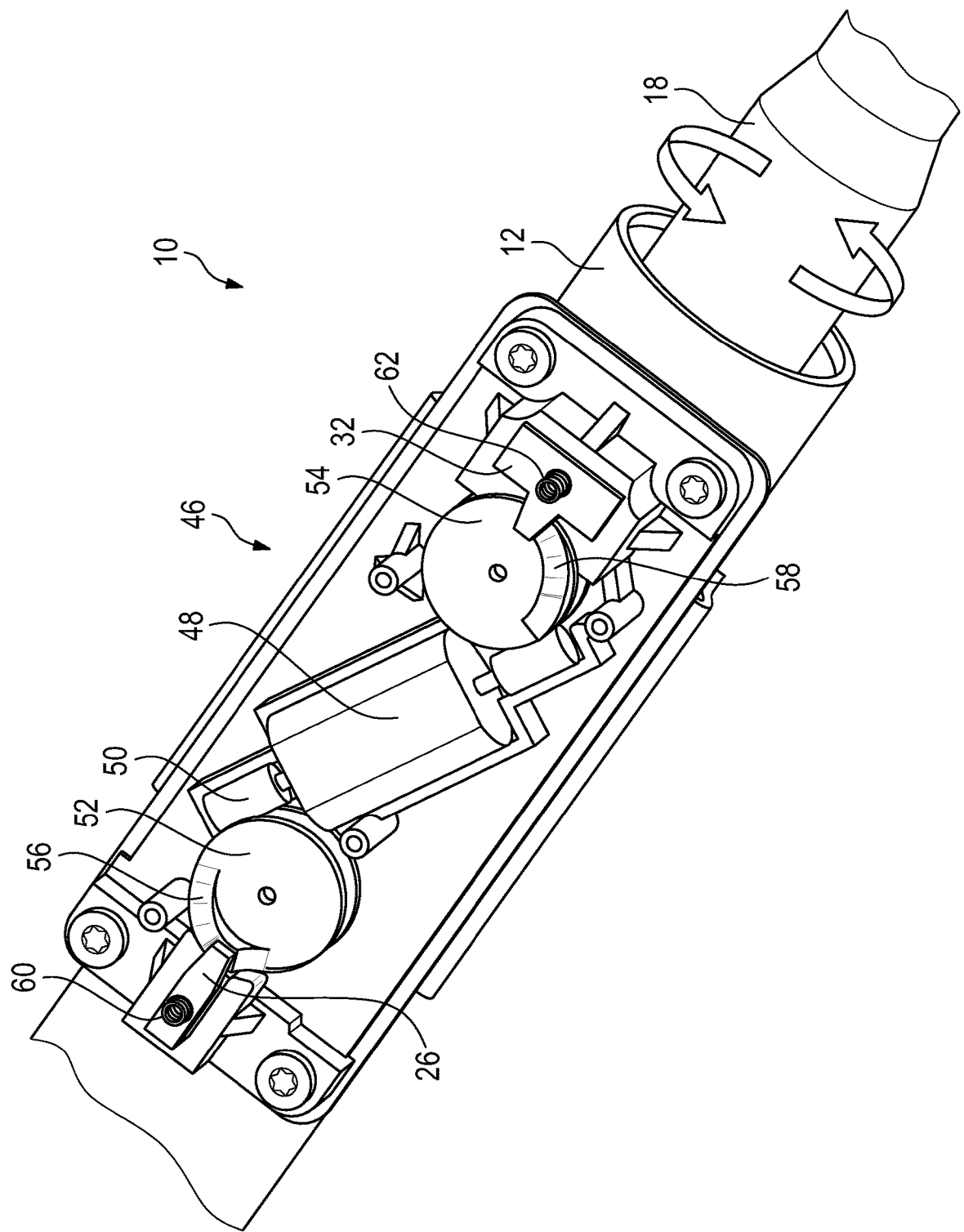
FIG. 3 is a perspective view of a detail of the steering system of FIG. 2, in which the switchable locking unit according to the invention is apparent.

The switchable locking unit 46 accordingly likewise has a telescopic adjusting mode in which the first switchable locking element 26 is in its closed position and the second switchable locking element 32 is in its open position, and a steering mode in which the first switchable locking element 26 is in its open position and the second switchable locking element 32 is in its closed position. The switchable locking unit 46, which is shown in greater detail in FIG. 3, wherein the cover is not shown so that the components of the locking unit 46 that are accommodated in the housing are visible.

In principle, the switchable locking unit 46 comprises, in addition to the two peg-shaped locking elements 26, 32, a drive 48 having a drive shaft 50. The drive 48 cooperates with the locking elements 26, 32 in order to adjust them between their respective open position and the respective closed position. To that end, the switchable locking unit 46 additionally comprises a first transfer member 52, which is associated with the first locking element 26, and a second transfer member 54, which is associated with the second locking element 32. The two transfer members 52, 54 are each driven in rotation by the drive shaft 50, which means that they are correspondingly rotatably mounted. For example, the drive shaft 50 meshes with the two transfer members 52, 54.

In principle, the two transfer members 52, 54 are associated with opposite ends of the drive shaft 50 and different sides of the drive shaft 50. In addition, the two transfer members 52, 54 each comprise a ramp-like contour 56, 58 on one surface, via which the transfer members 52, 54 cooperate with the locking elements 26, 32. Via the ramp-like contours 56, 58, a rotational movement of the transfer members 52, 54 is in each case converted into a lifting movement of the locking elements 26, 32. The two ramp-like contours 56, 58, in particular when the locking unit 46 is seen in a top view, are provided on the transfer members 52, 54 mirror-inverted relative to one another.

In principle, it is ensured that the locking elements 26, 32 are correspondingly driven by the drive 48 in opposite directions, so that only one of the two locking elements 26, 32 can be in its open or closed position. Consequently, it is impossible for both locking elements 26, 32 to be in their open or closed positions at the same time. In addition, the two locking elements 26, 32 are each biased via spring elements 60, 62, so that the two locking elements 26, 32 are biased into their respective closed position.

Accordingly, as soon as the ramp-like contour 56, 58 comes out of engagement, that is to say is inactivated, the locking elements 26, 32 are transferred into the closed position owing to the bias of the spring elements 60, 62. In other words, the ramp-like contours 56, 58 press the locking elements 26, 32 against the spring force of the spring elements 60, 62 into the respective open position when the ramp-like contours 56, 58 are engaged. As already mentioned, the functioning of the locking elements 26, 32 of the locking unit 46 is substantially the same as in the first embodiment according to FIG. 1.

In the operating state shown in FIG. 2, the first locking element 26 is in its open position whereas the second locking element 32 is in its closed position. Accordingly, a steering mode is active, in which torque transfer between the steering wheel and the first steering column portion 16 is possible. To that end, the second locking element 32 is located in a receiving groove 64 (extending around the entire periphery) of an insert 66 which is received in a receiving portion 68 of the second steering column portion 18.

In the steering mode shown, the second locking element 32 provides an interlocking connection for the second steering column portion 18, so that the second steering column portion cannot be adjusted axially. To that end, the second locking element 32 engages through a corresponding opening in the outer tube 12 in order to be able to interact with the second steering column portion 18, as described hereinbefore. If the switchable locking unit 46, or the steering column assembly 10, is now to be transferred into the telescopic adjusting mode, the drive 48 is correspondingly controlled, whereby both transfer members 52, 54 are driven in rotation.

This has the effect that the ramp-like contour 56 associated with the first locking element 26 comes out of engagement with the first locking element 26 and at the same time the ramp-like contour 58 of the second transfer member 54 cooperates, that is to say comes into engagement, with the second locking element 32, so that the second locking element is transferred from the closed position into the open position. As soon as the ramp-like contour 56 of the first transfer member 52 is no longer cooperating directly with the first locking element 26, the first locking element is transferred into the closed position on account of the spring bias.

Consequently, in the telescopic adjusting mode, the first locking element 26 is in its closed position whereas the second locking element 32 is in its open position. To that end, the first locking element 26 likewise extends through an opening in the outer tube 12. Axial displaceability of the second steering column portion 18 relative to the outer tube 12 and/or to the first steering column portion 16 is thus possible, because the axial interlocking connection of the second locking element 32 is no longer present.

By contrast, a rotational movement of the telescopic steering column 14 is now no longer possible because such a movement is prevented by the first locking element 26, which forms an interlocking connection in the radial direction for the second steering column portion 18, in particular a stop portion 70 of the second steering column portion 18, as is clear from FIG. 2. The stop portion 70 can be a radially outwardly protruding bar. When the rotary drive 28 is actuated, the second steering column portion 18 is then adjusted in the axial direction relative to the first steering column portion 16, analogously to the first embodiment, for which reason it is the telescopic adjusting mode. The rotary drive 28, analogously to the first embodiment, can be the force feedback actuator 30.

Likewise, analogously to the first embodiment, the first steering column portion 16 and the second steering column portion 18 can be coupled with one another via a thread, a spiral serration and/or a ball screw nut, that is to say can have a corresponding adjustment outside geometry or adjustment inside geometry.

The invention claimed is:

1. A steering column assembly for a motor vehicle, having an outer tube which is arranged in a rotationally fixed manner, a telescopic steering column which is received at least in part in the outer tube, and a rotary drive which is adapted to telescopically adjust the telescopic steering column, wherein the telescopic steering column comprises a first steering column portion and a second steering column portion which surrounds the first steering column portion at least in part, wherein the two steering column portions are coupled with one another in a telescopic portion in such a manner that they are telescopically displaceable relative to one another, wherein the rotary drive is in engagement with the first steering column portion so that the rotary drive transfers a force to the first steering column portion in order to telescopically adjust the telescopic steering column, wherein a first switchable locking element is coupled with the outer tube and the second steering column portion, wherein the first switchable locking element has an open position and a closed position, and wherein the first switchable locking element in the open position permits a relative rotation of the second steering column portion relative to the outer tube and/or in the closed position prevents a relative rotation of the second steering column portion relative to the outer tube.

2. The steering column assembly as claimed in claim 1, wherein the second steering column portion has, at an opposite end to the first steering column portion, a steering wheel interface via which a steering wheel can be attached.

3. The steering column assembly as claimed in claim 1, wherein the rotary drive is in the form of a force feedback actuator.

4. The steering column assembly as claimed in claim 1, wherein there is provided a second switchable locking element which is coupled with the first steering column portion and the second steering column portion, wherein the second switchable locking element has an open position and a closed position.

5. The steering column assembly as claimed in claim 4, wherein the second switchable locking element in the open position permits a relative movement of the second steering column portion relative to the first steering column portion and/or in the closed position prevents a relative movement of the second steering column portion relative to the first steering column portion.

6. The steering column assembly as claimed in claim 1, wherein the steering column assembly has a telescopic adjusting mode in which the first switchable locking element is in its closed position and a second switchable locking element is in its open position and/or a steering mode in which the first switchable locking element is in its open position and the second switchable locking element is in its closed position.

7. The steering column assembly as claimed in claim 6, wherein the second switchable locking element in the open position permits a relative movement of the second steering column portion relative to the first steering column portion and/or in the closed position prevents a relative movement of the second steering column portion relative to the first steering column portion.

8. The steering column assembly as claimed in claim 1, wherein the first steering column portion has on the outside an adjustment outside geometry which corresponds to an adjustment inside geometry on the inside of the second steering column portion.

9. The steering column assembly as claimed in claim 8, wherein the adjustment outside geometry and/or the adjustment inside geometry comprise or comprises a thread, a spiral serration and/or a ball screw nut.

10. The steering column assembly as claimed in claim 1, wherein there is provided a switchable locking unit which comprises the first switchable locking element and a second switchable locking element which cooperate with at least one drive, wherein the switchable locking unit has a telescopic adjusting mode in which the first switchable locking element is in its closed position and the second switchable locking element is in its open position, and/or wherein the switchable locking unit has a steering mode in which the first switchable locking element is in its open position and the second switchable locking element is in its closed position.

11. A switchable locking unit for a steering column assembly, having a first switchable locking element and a second switchable locking element which cooperate with at least one drive, wherein a first transfer member driven by the drive is associated with the first switchable locking element, wherein a second transfer member driven by the drive is associated with the second switchable locking element, wherein the first transfer member and the second transfer member each have a ramp-like contour via which the respective transfer member cooperates with the associated locking element, and wherein the switchable locking unit has at least one of
    a telescopic adjusting mode in which the first switchable locking element is in its closed position and the second switchable locking element is in its open position, and
    a steering mode in which the first switchable locking element is in its open position and the second switchable locking element is in its closed position.

12. The switchable locking unit as claimed in claim 11, wherein the first transfer member and/or the second transfer member are/is configured to transfer a rotational movement into a lifting movement of the associated locking element.

13. A steering column assembly for a motor vehicle, the steering column assembly comprising:
    an outer tube arranged in a rotationally fixed manner;
    a telescopic steering column received at least in part in the outer tube, the telescopic steering column having a first steering column portion and a second steering column portion that surrounds the first steering column portion at least in part, the first and second steering column portions being coupled with one another in a telescopic portion in such a manner that the first and second steering column portions are telescopically displaceable relative to one another; and
    a rotary drive adapted to telescopically adjust the telescopic steering column, the rotary drive engaging the first steering column portion so that the rotary drive transfers a force to the first steering column portion in order to telescopically adjust the telescopic steering column;
    the steering column assembly having at least one of
        a telescopic adjusting mode in which a first switchable locking element is in a closed position and a second switchable locking element is in an open position, and
        a steering mode in which the first switchable locking element is in an open position and the second switchable locking element is in a closed position.

14. The steering column assembly as claimed in claim 13, wherein the first switchable locking element in the open position permits a relative rotation of the second steering column portion relative to the outer tube and/or in the closed position prevents a relative rotation of the second steering column portion relative to the outer tube.

15. The steering column assembly as claimed in claim 13, wherein the second switchable locking element in the open position permits a relative movement of the second steering column portion relative to the first steering column portion and/or in the closed position prevents a relative movement of the second steering column portion relative to the first steering column portion.

16. The steering column assembly as claimed in claim 13, wherein the second steering column portion has, at an opposite end to the first steering column portion, a steering wheel interface via which a steering wheel can be attached.

17. The steering column assembly as claimed in claim 13, wherein the second switchable locking element is coupled with the first steering column portion and the second steering column portion.

18. The steering column assembly as claimed in claim 13, the first switchable locking element is coupled with the outer tube and the second steering column portion.

19. The steering column assembly as claimed in claim 13, wherein the first steering column portion has on the outside an adjustment outside geometry which corresponds to an adjustment inside geometry on the inside of the second steering column portion.

20. The steering column assembly as claimed in claim 19, wherein the adjustment outside geometry and/or the adjustment inside geometry comprise or comprises a thread, a spiral serration and/or a ball screw nut.

* * * * *